United States Patent [19]
Hiramatsu

[11] Patent Number: 6,072,647
[45] Date of Patent: Jun. 6, 2000

[54] REPRODUCED SIGNAL WAVEFORM CONTROL DEVICE FOR MAGNETORESISTIVE HEAD

[75] Inventor: Kenichi Hiramatsu, Tokyo, Japan

[73] Assignee: NEC Corporation, Tokyo, Japan

[21] Appl. No.: 08/908,012

[22] Filed: Aug. 11, 1997

[30] Foreign Application Priority Data

Aug. 12, 1996  [JP]  Japan ..................................... 8-212519

[51] Int. Cl.[7] ....................................................... G11B 5/09
[52] U.S. Cl. ................................ 360/46; 360/39; 360/65; 360/113
[58] Field of Search .................................. 360/46, 39, 65, 360/113, 25; 324/76.12; 327/55, 67, 307

[56] References Cited

U.S. PATENT DOCUMENTS

| | | | |
|---|---|---|---|
| 4,914,398 | 4/1990 | Jove et al. ................................ | 328/167 |
| 5,483,393 | 1/1996 | Mento et al. .......................... | 360/77.08 |
| 5,625,505 | 4/1997 | Ohmori et al. ............................ | 360/46 |
| 5,744,993 | 4/1998 | Sonntag ................................... | 327/307 |

FOREIGN PATENT DOCUMENTS 5266403  10/1993  Japan ................................ G11B 5/02

*Primary Examiner*—Nabil Hindi
*Assistant Examiner*—Joseph M Vann
*Attorney, Agent, or Firm*—Hayes, Soloway, Hennessey, Grossman & Hage PC

[57] ABSTRACT

When a reproduced signal is outputted from the MR head to the envelope detector, the positive envelope joining positive peaks and the negative envelope joining negative peaks are outputted from the envelope detector to the asymmetry detector. An asymmetry value or fluctuation value of the reproduced signal waveform can be found through comparison of the positive envelope and negative envelope and calculation at the asymmetry detector. If these values do not fall within a desired or permissible range, a high degree of asymmetry is indicated in the reproduced signal waveform, and the sense current controller accordingly alters the sense current value. This operation is continued until the envelope of the reproduced signal waveform resulting from the new sense current falls within the desired or permissible range.

15 Claims, 4 Drawing Sheets

REPRODUCED SIGNAL WAVEFORM CONTROL DEVICE FOR MAGNETORESISTIVE HEAD

BACKGROUND OF THE INVENTION

1. Field of the Invention

The present invention relates to a reproduced signal waveform control device for a MR (magneto-resistive) head, and particularly to a reproduced signal waveform control device for realizing a magnetic recording device capable of high recording density and high reliability.

2. Description of the Related Art

Ever greater recording density is being sought for magnetic recording devices connected to small host computers, and tests are being conducted to introduce new technology including heads in which MR (magneto-resistive) elements are used in the reproducing element (hereinbelow referred to as "MR heads") and PRML (Partial Response Maximum Likelihood) signal processing technology. The waveform of a reproduced signal of magnetic recording devices employing these MR heads, however, exhibits a great variance between the output amplitude/half power width of positive pulses and the output amplitude/half power width of negative pulses (hereinbelow referred to as "asymmetry"), and this problem has been a problem for achieving higher density in magnetic recording devices. The effect of this asymmetry is particularly pronounced when an MR head and PRML signal processing technology are used simultaneously and has posed a barrier to achieving higher density.

Various methods have been proposed for reducing this asymmetry. The invention of Japanese Patent Laid-open No. 205903/92, for example, proposes a method in which the peak value of the positive pulse and the peak value of the negative pulse in one isolated pulse are detected, and the difference between the two is taken and optimized. However, because only one isolated pulse or individual isolated pulses are detected, this invention suffers from the drawback of not being able to adequately cope with the characteristic of various components operating under different conditions within a device, or with cases in which conditions or state changes or the characteristic of an isolated wave differs from the average characteristic. Moreover, with the trend in recent years toward narrower tracks, there is a growing demand for smaller MR elements, and this has given rise to the problem of fluctuation in asymmetry during operation of a device (hereinbelow referred to as "instability"). The above-described prior art has been completely unable to cope with such instability in asymmetry during operation, and as a consequence, there has been a call for the development of new signal processing methods and circuits.

SUMMARY OF THE INVENTION

The object of the present invention, therefore, is to provide a reproduced signal waveform control device for an MR head that optimizes the asymmetry of the reproduced signal waveform of a magneto-resistive head, that can deal with instability, and that can realize a magnetic recording device having high recording density and high reliability.

The reproduced signal waveform control device according to the present invention is provided with: an envelope detector that detects a positive envelope that joins positive peaks and a negative envelope that joins negative peaks for a reproduced signal obtained from the sense current of an MR head; an asymmetry detector that senses asymmetry of the positive envelope and negative envelope detected in the envelope detector; and a sense current controller that controls the sense current of the MR head such that asymmetry detected in the asymmetry detector is contained within a fixed range.

When a reproduced signal is outputted from the MR head to the envelope detector, the positive envelope joining positive peaks and the negative envelope joining negative peaks are outputted from the envelope detector to the asymmetry detector. An asymmetry value or fluctuation value of the reproduced signal waveform can be found through comparison of the positive envelope and negative envelope and calculation at the asymmetry detector. If these values do not fall within a desired or permissible range, a high degree of asymmetry is indicated in the reproduced signal waveform, and the sense current controller accordingly alters the sense current value. This operation is continued until the envelope of the reproduced signal waveform resulting from the new sense current falls within the desired or permissible range.

In addition, an integrating circuit that integrates each of the positive envelope and negative envelope may also be added such that asymmetry between the positive envelope and negative envelope is detected based on the integral obtained by this integrating circuit. Moreover, a switching circuit may also be provided that outputs the reproduced signal to either one of a PRML signal processor and an envelope detector.

Through the use of a reproduced signal waveform controlling device according to the present invention, asymmetry in a reproduced signal waveform can be eliminated (made an arbitrary value); asymmetry in not only one but all reproduced signal waveforms can be eliminated (made an arbitrary value); or fluctuation due to the occurrence of, for example, transient response in an amplifying circuit can be managed; and the reproduced signal can be transmitted to a signal processor. In addition, the present invention enables a return to an optimal waveform signal and transmission to a signal processor even in the event of fluctuation in asymmetry (instability) during normal operation of a magnetic recording device. As a result, the problems of major divergence between the output amplitude/half power width of the positive pulses and negative pulses of a reproduced signal waveform as well as fluctuation or instability of asymmetry during operation of the device in a magnetic recording device employing a MR head can be overcome by means of an extremely simple construction, thereby realizing a magnetic recording device having high recording density and high reliability.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Figure 1:
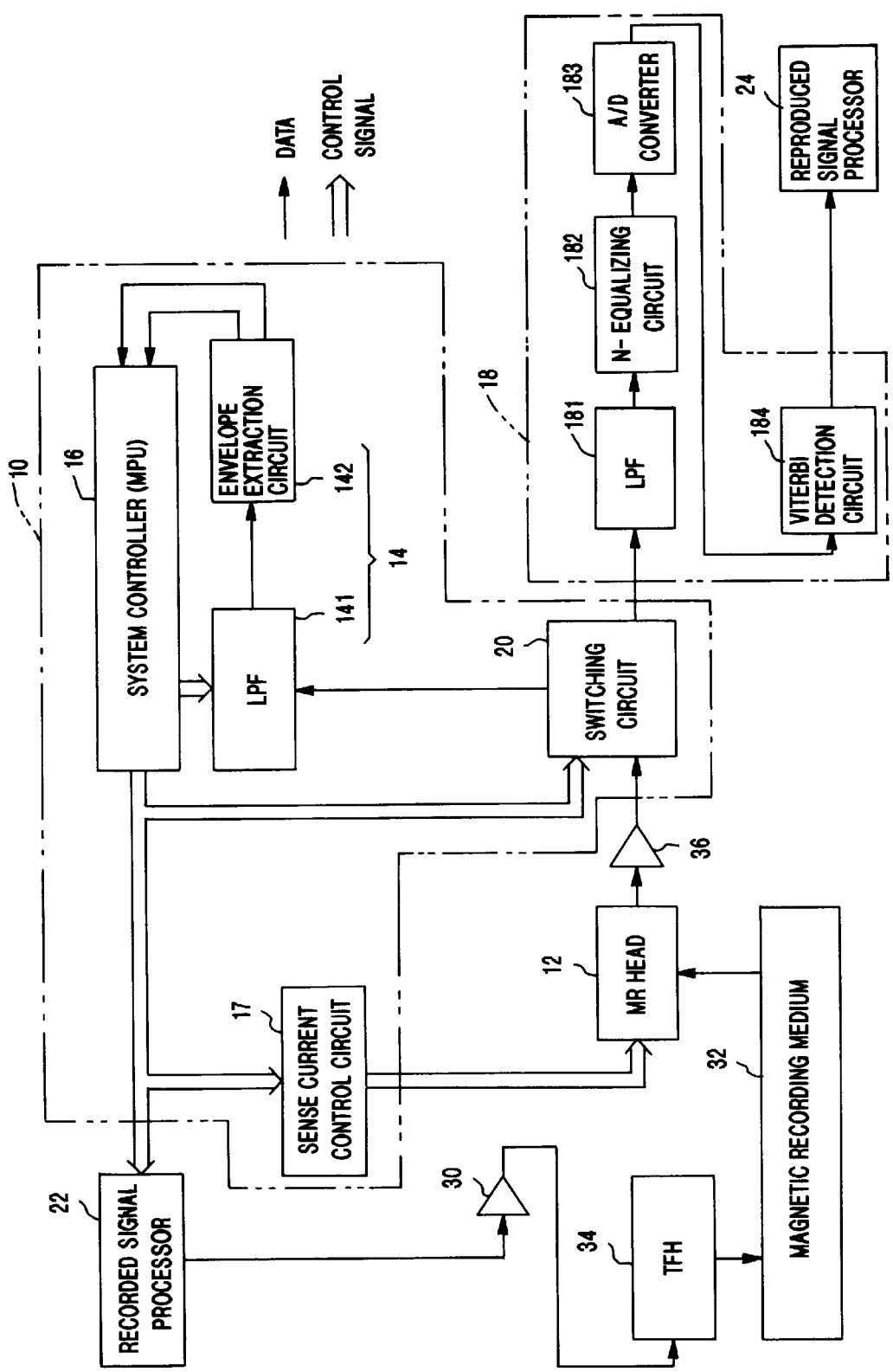
FIG. 1 is a function block diagram showing the first embodiment of a reproduced signal waveform control device according to the present invention.

Referring to FIG. 1, the reproduced signal waveform control device 10 of the first embodiment according to the present invention comprises envelope detector 14 that detects a positive envelope that joins positive peaks and a negative envelope that joins negative peaks with respect to a reproduced signal obtained from the sense current of MR head 12; asymmetry detector (system controller 16) that detects asymmetry between the positive envelope and negative envelope detected at envelope detector 14; sense current controller (system controller 16 and sense current control circuit 17) that controls the sense current of MR head 12 such that asymmetry detected by the asymmetry detector is contained within a set range; and switching circuit 20 that outputs the reproduced signal to one of PRML signal processor 18 and envelope detector 14.

System controller 16 consists of an MPU (micro processing unit) and its program, and in addition to the functions of asymmetry detector and sense current controller, further includes the functions of controlling switching circuit 20, recorded signal processor 22, PRML signal processor 18 (PR4:n=3), and reproduced signal processor 24. Sense current controller consists of one portion of the functions of system controller 16 and by sense current control circuit 17 that changes the sense current value supplied to MR head 12 according to the commands of system controller 16. Envelope detector 14 is made up of a low-pass filter 141 that removes the high-frequency noise from the reproduced signal and shapes the signal and envelope extraction circuit 142 that extracts an envelope from the reproduced signal that has been shaped by low-pass filter 141.

Amplifying circuit 30 for amplification of the recorded signal and recording thin-film head 34 for writing information to magnetic recording medium 32 by means of the recorded signal amplified by amplifying circuit 30 are connected to recorded signal processor 22. MR head 12 is connected to amplifying circuit 36 for amplifying the reproduced signal. PRML signal processor 18 is of typical construction, and is composed of low-pass filter 181, n-equalizing circuit 182, A/D converter 183, and Viterbi detection circuit 184.

Explanation will next be presented focusing on the operation of system controller 16 based on FIG. 1 and FIG. 2.

First, system controller 16, which controls the system overall, sends a control signal to switching circuit 20 and recorded signal processor 22 to switch over to an asymmetry improving mode, whereupon recorded signal processor 22 generates a recorded signal of frequency 2T (FIG. 2a) and switching circuit 20 outputs a reproduced signal to envelope detector 14. The recorded signal of period 2T is amplified by amplifying circuit 30 and is written to magnetic recording medium 32 by recording thin-film head 34.

Figure 2A:
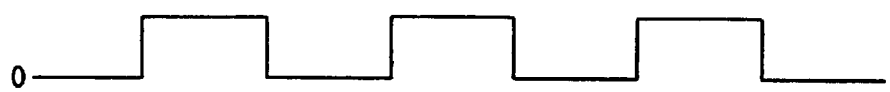
FIG. 2 shows waveform charts demonstrating one example of the operation of the reproduced signal waveform control device shown in FIG. 1, FIG. 2a showing the recorded signal outputted from the recorded signal processor, FIG. 2b showing the reproduced signal outputted from the MR head, FIG. 2c showing a good envelope outputted from the envelope extraction circuit, and FIG. 2d showing an asymmetric envelope outputted from the envelope extraction circuit.
Figure 2B:
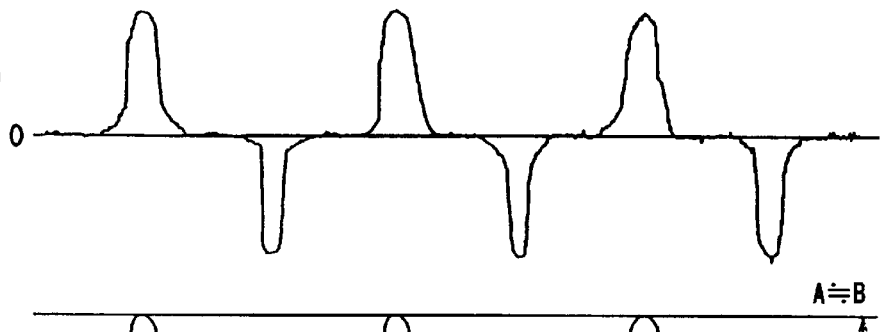
Figure 2C:
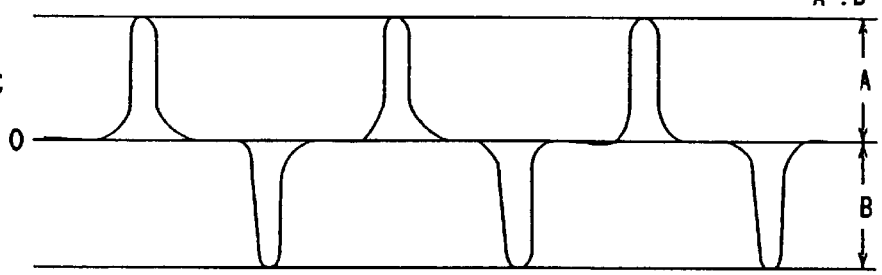
Figure 2D:
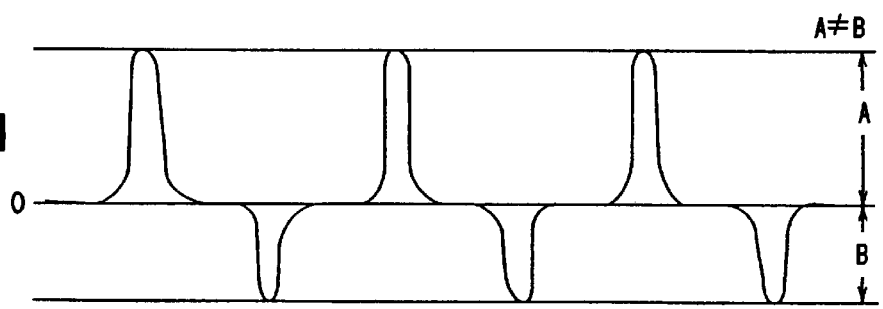

The recorded signal of period 2T written to magnetic recording medium 32 is outputted to envelope detector 14 by way of amplifying circuit 36 and switching circuit 20 (FIG. 2b). At envelope detector 14, noise is eliminated from the reproduced signal by low-pass filter 141 and positive envelope A and negative envelope B are extracted from the reproduced signal at envelope extraction circuit 142 (FIG. 2c, FIG. 2d). The values of positive envelope A and negative envelope B are outputted to system controller 16, and comparison and calculation are executed at system controller 16. When a waveform shown in FIG. 2d is obtained, system controller 16 determines that asymmetry exists in the reproduced signal waveform of MR head 12 and sends a control signal to sense current control circuit 17 to change the sense current value. MR head 12 then converts the recorded signal written to magnetic recording medium 32 to a reproduced signal at a new sense current value. The above-described operations are subsequently repeated until a waveform such as shown in FIG. 2c is obtained.

When the waveform shown in FIG. 2c is obtained, system controller 16 sends a control signal to switching circuit 20 in order to switch over to the normal PRML signal processing mode, whereupon switching circuit 20 begins outputting the reproduced signal to PRML signal processor 18. In this way, PRML signal processing can be carried out with the optimum reproduced signal waveform.

For constant monitoring of asymmetry, system controller 16 sends control signals to switching circuit 20 from time to time to bring about a switch over to the asymmetry improvement mode to check for instability in asymmetry. At such times, a similar operation can be effected by reproducing a signal already recorded to magnetic recording medium 32 using MR head 12. Moreover, checks for instability in asymmetry can be effected at any time by switching over to the asymmetry improvement mode and carrying out the above-described operations. In addition, while this embodiment actually writes a recorded signal of period 2T to magnetic recording medium 32, a signal already written to magnetic recording medium 32 may also be used without any problem.

Figure 3:
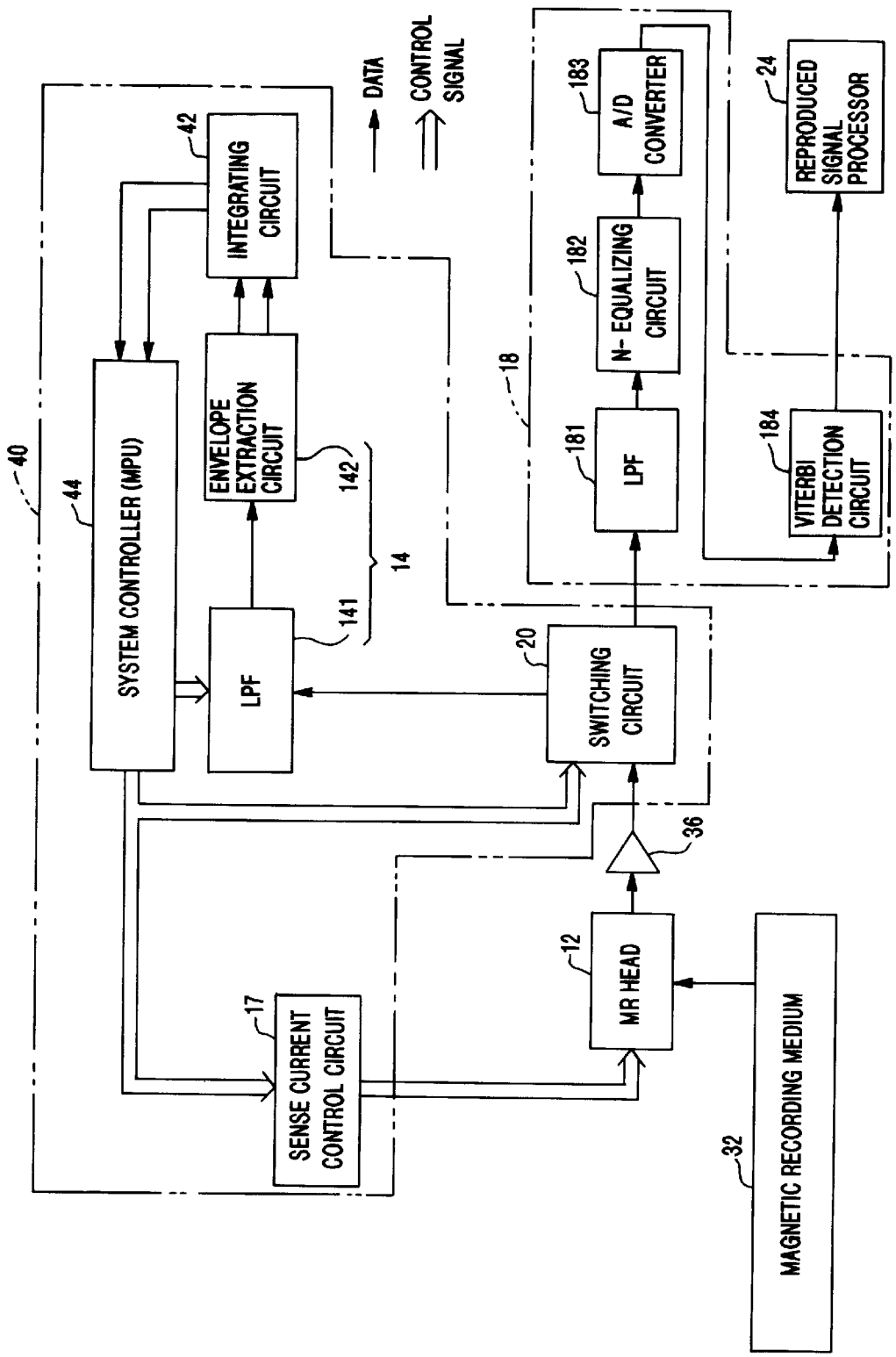
FIG. 3 is a function block diagram showing the second embodiment of the reproduced signal waveform control device according to the present invention.

Referring to FIG. 3, there is shown the second embodiment of the reproduced signal waveform control device according to the present invention, and a description of this embodiment based on this figure follows hereinbelow. Components identical to those shown in FIG. 1 are identified with the same reference numerals and redundant explanation is here omitted.

The reproduced signal waveform control device 40 of this embodiment is provided with envelope detector 14 that detects a positive envelope that joins positive peaks and a negative envelope that joins negative peaks with respect to a reproduced signal obtained from a sense current of MR head 12; integrating circuit 42 that integrates each of the positive envelope and negative envelope detected by envelope detector 14; asymmetry detector (system controller 44) that detects asymmetry between the positive envelope and negative envelope based on integrals obtained by integrating circuit 42; sense current controller (system controller 44 and sense current control circuit 17) that controls the sense current of MR head 12 such that asymmetry detected by the asymmetry detector is contained within a set range; and switching circuit 20 that outputs the reproduced signal to either one of PRML signal processor 18 or envelope detector 14.

System controller 44 differs with respect to system controller 16 of FIG. 1 in only one portion of the program relating its functions as an asymmetry detector and otherwise has the same configuration.

Explanation is presented hereinbelow focusing on the operation of system controller 44 based on FIG. 3 and FIG. 4.

First, system controller 44, which controls the operation overall, sends a control signal to switching circuit 20 in order to switch over to the asymmetry improving mode, whereupon switching circuit 20 outputs the reproduced signal to envelope detector 14. In the magnetic recording medium 32 of this embodiment, a single-period synchronizing pattern for a PLO (phase-locked oscillator) has already been recorded before a portion in which any data are recorded.

Figure 4A:
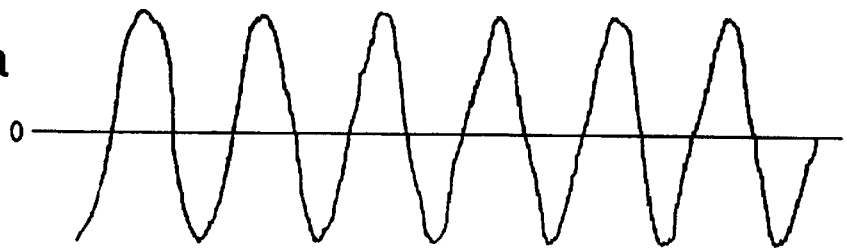
FIG. 4 shows waveform charts demonstrating one example of the operation of the reproduced signal waveform control device shown in FIG. 3, FIG. 4a showing the reproduced signal outputted from the MR head, FIG. 4b showing a good envelope outputted from the envelope extraction circuit, and FIG. 4c showing an asymmetric envelope outputted from the envelope extraction circuit.
Figure 4B:
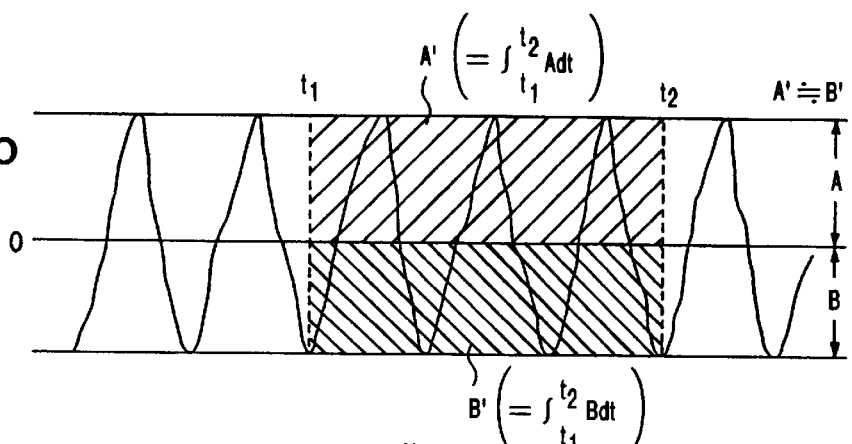
Figure 4C:
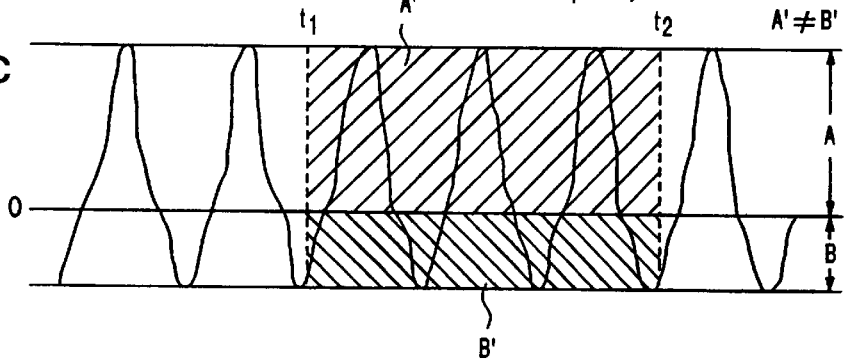

The recorded signal is converted by MR head 12 to a reproduced signal and outputted to envelope detector 14 by way of amplifying circuit 36 and switching circuit 20 (FIG. 4a). In envelope detector 14, noise is eliminated from the reproduced signal at low-pass filter 141, and positive envelope A and negative envelope B are extracted from the reproduced signal at envelope extractor 142 (FIG. 4b, FIG. 4c). The values of positive envelope A and negative envelope B are outputted to integrating circuit 42 and integrals A' and B' are found for each. Integrals A' and B' are outputted to system controller 44, and comparison and calculation are carried out at system controller 44. Integrals A' and B' here are used for the purpose of eliminating the influence of instantaneous values. When a waveform such as is shown in FIG. 4c is obtained, system controller 44 determines that a high degree of asymmetry is present in the reproduced signal waveform of MR head 12 and sends a control signal to sense current control circuit 17 to change the sense current value, whereupon MR head 12 converts the recorded signal that has been written to magnetic recording medium 32 to a reproduced signal at the new sense current value. The above-described operations are then repeated until a waveform such as is shown in FIG. 4b is obtained.

When a waveform such as shown in FIG. 4b is obtained, system controller 44 sends a control signal to switching circuit 20 so as to switch over to the normal PRML signal processing mode, whereupon switching circuit 20 begins to output the reproduced signal to PRML signal processor 18. In this way, PRML signal processing can be carried out with the optimum reproduced signal waveform.

By sending a control signal to switching circuit 20 from time to time, system controller 44 can switch over to the asymmetry improving mode to check for instability in the asymmetry in order to constantly monitor asymmetry. At such times, equivalent operation can be carried out by reproducing signals that have already been recorded to magnetic recording medium 32 by MR head 12. Moreover, instability in asymmetry can be checked at any time by switching over to the asymmetry improving mode and executing the above-described operations.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A reproduced signal waveform control device for a MR head comprising:

an envelope detector circuit for detecting a positive envelope that joins positive peaks and a negative envelope that joins negative peaks for a reproduced signal waveform obtained from the sense current of an MR head;

a system controller comprising an asymmetry detector circuit for detecting asymmetry between the amplitude and/or half power width of the positive envelope and the amplitude and/or half power width of the negative envelope detected in the envelope detector by comparing said positive and negative envelopes; and a sense current controller circuit for controlling the sense current of said MR head such that asymmetry detected in the asymmetry detector circuit is contained within a fixed range.

2. A reproduced signal waveform control device for a MR head according to claim 1, further comprising a switching circuit that outputs said reproduced signal to either a PRML signal processor circuit or said envelope detector.

3. A reproduced signal waveform control device for a MR head comprising:

an envelope detector circuit for detecting a positive envelope that joins positive peaks and a negative envelope that joins negative peaks for a reproduced signal obtained from the sense current of an MR head;

an integrating circuit for integrating each of the positive envelope and negative envelope detected by the envelope detector;

a system controller comprising an asymmetry detector circuit for detecting asymmetry between the amplitude and/or half power width of the positive envelope and the amplitude and/or half power width of the negative envelope based on integrals obtained by the integrating circuit by comparing said positive and negative envelopes; and a sense current controller for controlling the sense current of said MR head such that asymmetry detected by the asymmetry detector circuit is contained within a fixed range.

4. A reproduced signal waveform control device for a MR head according to claim 3, further comprising a switching circuit for outputting said reproduced signal to either a PRML signal processor or said envelope detector.

5. A device as claimed in claim 1, wherein said envelope detector circuit comprises a low pass filter circuit for removing high frequency components from said negative and positive envelopes and an envelope extraction circuit for extracting a positive envelope and a negative envelope.

6. A device as claimed in claim 1, further comprising a switching circuit for activating said system controller and said sense current controller circuit when said asymmetry detected in said asymmetry detector circuit is outside of a said fixed range.

7. A device as claimed in claim 6, wherein said switching circuit being periodically activated by said system controller to output said reproduced signal waveform to said asymmetry detector circuit for detecting asymmetry of said positive envelope and said negative envelope.

8. A device as claimed in claim 2, wherein said PRML signal processor circuit comprises a filter circuit, an equalizing circuit, an A/D converter circuit, and a viterbi detection circuit to digitize and process said reproduced signal waveform.

9. A device as claimed in claim 1, further comprising a digitizing circuit for digitizing said reproduced signal waveform and a reproduced signal processor for processing the resulting digitized reproduced signal waveform.

10. A device as claimed in claim 1, further comprising an integrating circuit for integrating said positive envelope and said negative envelope detected by said envelope detector.

11. A device as claimed in claim 3, wherein said envelope detector circuit comprises a low pass filter circuit for removing high frequency components from said negative envelope and said positive envelope and an envelope extraction circuit for extracting a positive envelope and a negative envelope.

12. A device as claimed in claim 3, further comprising a switching circuit for activating said system controller and said sense current controller when asymmetry detected in said asymmetry detector circuit is outside of a said fixed range.

13. A device as claimed in claim 12, wherein said switching circuit being periodically activated by said system controller to output said reproduced signal waveform to said asymmetry detector circuit for detecting asymmetry of said positive envelope and said negative envelope.

14. A device as claimed in claim 4, wherein said PRML signal processor circuit comprises a filter circuit, an equalizing circuit, an A/D converter circuit, and a viterbi detection circuit to digitize and process said reproduced signal waveform.

15. A device as claimed in claim 3, further comprising a digitizing circuit for digitizing said reproduced signal waveform and a reproduced signal processor for processing the resulting digitized reproduced signal waveform.

* * * * *